United States Patent [19]
Selina et al.

[11] Patent Number: 5,946,929
[45] Date of Patent: Sep. 7, 1999

[54] RV REFRIGERATOR WITH COMBUSTION SEAL AND HEAT DEFLECTOR

[75] Inventors: John R. Selina, Brighton, Mich.; David W. Leistner, Sidney, Ohio

[73] Assignee: Norcold, Inc., Sidney, Ohio

[21] Appl. No.: 09/105,240

[22] Filed: Jun. 26, 1998

Related U.S. Application Data

[60] Provisional application No. 60/051,541, Jul. 2, 1997.

[51] Int. Cl.[6] .............................. F25D 23/12; B60H 1/32; B60H 1/22
[52] U.S. Cl. ................................ 62/263; 62/244; 62/476; 237/28; 237/29
[58] Field of Search .............................. 62/101, 476, 244, 62/239, 263, 331, 497; 126/307 A; 237/29, 30, 31, 32, 33, 28

[56] References Cited

U.S. PATENT DOCUMENTS

| | | | |
|---|---|---|---|
| 3,245,244 | 4/1966 | Wilkinson | 62/239 |
| 3,668,889 | 6/1972 | Magnusson et al. | 62/476 |
| 3,771,320 | 11/1973 | Kenneryd et al. | 62/239 |
| 4,016,730 | 4/1977 | DeVilliers | 62/476 |
| 4,286,569 | 9/1981 | Bergman et al. | 62/239 |
| 5,355,693 | 10/1994 | McConnell et al. | 62/244 |
| 5,782,105 | 7/1998 | Stork | 62/331 |

*Primary Examiner*—William Doerrler
*Attorney, Agent, or Firm*—Harness, Dickey & Pierce, P.L.C.

[57] ABSTRACT

A refrigerator for recreational vehicles comprising a generally cubic cabinet having front, back and top sides along with absorbent-type refrigerating apparatus on the back side. A flap member adjustably mounted on the back side at a position above the refrigerating apparatus extends upwardly and outwardly from the cabinet into sealing engagement with the walls of the compartment in the recreational vehicle in which the refrigerator is installed. The configuration of the flap member and the mounting of the flap member so that it can readily be adjusted to a number of positions enhances the ability of the flap member to prevent gases created by the refrigerating apparatus from propagating into the living quarters of the recreational vehicle.

4 Claims, 2 Drawing Sheets

RV REFRIGERATOR WITH COMBUSTION SEAL AND HEAT DEFLECTOR

This application claims benefit of Provisional Application No. 60/051,541 Jul. 2, 1997.

BACKGROUND OF THE INVENTION

This invention relates generally to a refrigerator for a recreational vehicle, such as an RV or a trailer home, where living space is limited. Such a refrigerator includes absorption refrigerating apparatus that uses bottled gas such as propane. The combustion gases generated by the refrigerating apparatus are desirably kept out of the living space. The principal object of this invention is to provide such a refrigerator with a built-in seal system which confines the combustion gases to a sealed area in the vehicle which is remote from the living space and is subjected to a continuous flow of outside air for ventilation purposes.

SUMMARY OF THE INVENTION

In this invention, the refrigerator cabinet is provided with an adjustable seal system consisting of adjustable flap members extending from the upper rear edge of the cabinet. The cabinet is located in the RV so that the flap members will seal against inner wall surfaces. Combustion gases are thus deflected by the flap members and kept out of the living area. The gases are forced to flow through the RV ventilation system and discharge outside the RV.

Further objects, features and advantages of the invention will become apparent from a consideration of the following description and the appended claims when taken in connection with the accompanying drawing.

DETAILED DESCRIPTION OF THE PREFERRED EMBODIMENT

Figure 1:
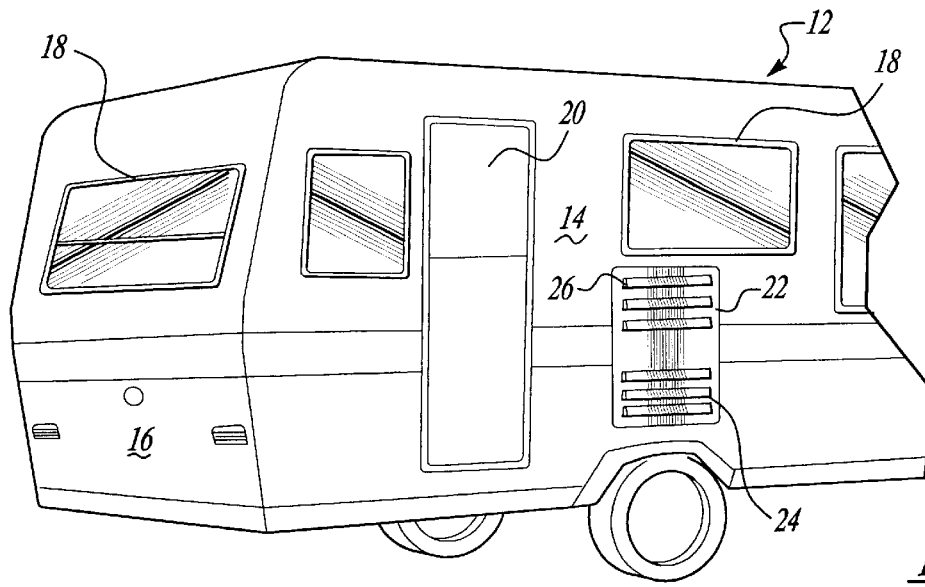
FIG. 1 is a fore-shortened perspective view of a recreational vehicle with a refrigerator provided with the seal and deflector of this invention.
Figure 2:
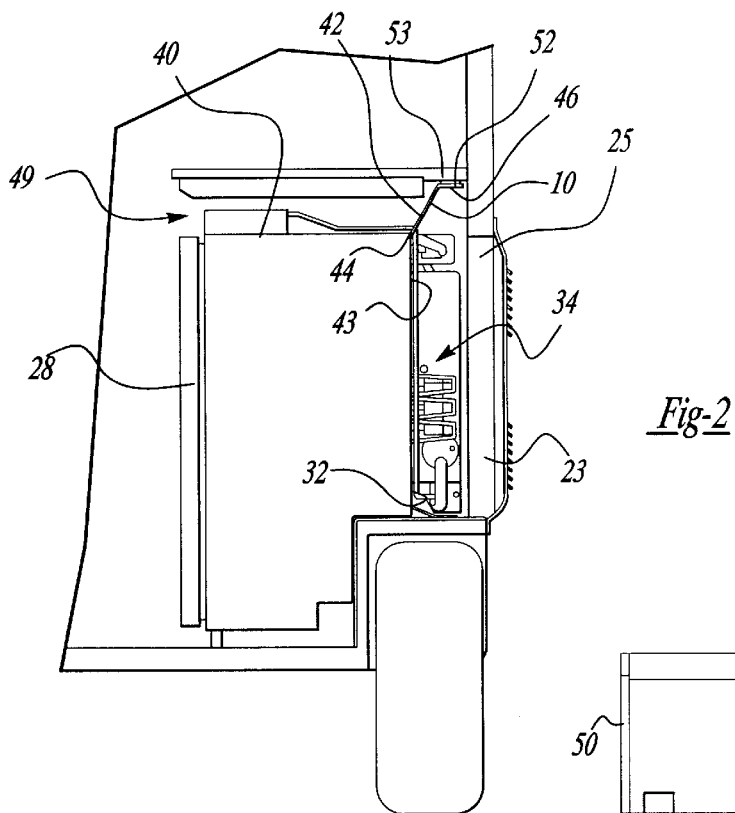
FIG. 2 is a side view of the RV refrigerator of this invention.

With reference to the drawing, the improved refrigerator with combustion seal and heat deflector of this invention is indicated generally at 10 in FIGS. 1 and 2. The refrigerator 10 is particularly intended for use in a recreational vehicle such as the vehicle 12 illustrated in FIG. 1 which has a side wall 14, a rear wall 16, windows 18, an entrance door 20 and a ventilation panel 22 which overlays vent openings 23 and 25 (FIG. 2) in the side wall 14. The panel 22 has lower louvers 24 which overlay air inlet openings and upper louvers 26 which overlay vent openings to promote the flow of air into and out of the interior of the vehicle 12. Upper louvers 26 overlay vent openings to provide a path for exit of combustion gases and the like which it is desired to exclude from the atmosphere inside the living space of the recreational vehicle 12.

The refrigerator 10 comprises a generally block shape cabinet 27 having a front side door 28, side walls 30 and a rear wall 32. The refrigerator 10 is of the absorption-type which uses a heat source to effect refrigeration. An absorption refrigerator has a heat generator which heats a solution of a refrigerant and an absorbent. The heat releases the refrigerant from the absorbent to form a high pressure refrigerant vapor. The refrigerant vapor is condensed in a cooling condenser. Low pressure solution from the heat generator is sprayed on the refrigerant vapor in an absorber to absorb the vapor. The absorption causes the pressure of the vapor to be reduced, thereby causing evaporation in an evaporator between the condenser and the absorber. The refrigerant vapor expands in the evaporator which causes a temperature drop in the refrigerant which is used to cool the interior of the refrigerator 10. Refrigeration apparatus of the absorption type is commonly used and has been known for a long time. This well known apparatus is used in the refrigerator 10 and is indicated generally at 34 in FIG. 2 mounted on the back wall 32 of the refrigerator cabinet 27.

As shown in FIG. 2, a flat panel member 43 is mounted on the back wall 32 of the refrigerator cabinet 27. An unsupported flap member 42, consisting of a flat body integral with the panel 43, extends upwardly and rearwardly from the juncture 44 of the back wall 32 of the cabinet 27 and the top wall 40. At its upward and outward end, the flap 42 has a bendable extension 46 which is extended outwardly to enhance the ability of the extension 46 of the flap 42 to seal against a wall.

Figure 5:
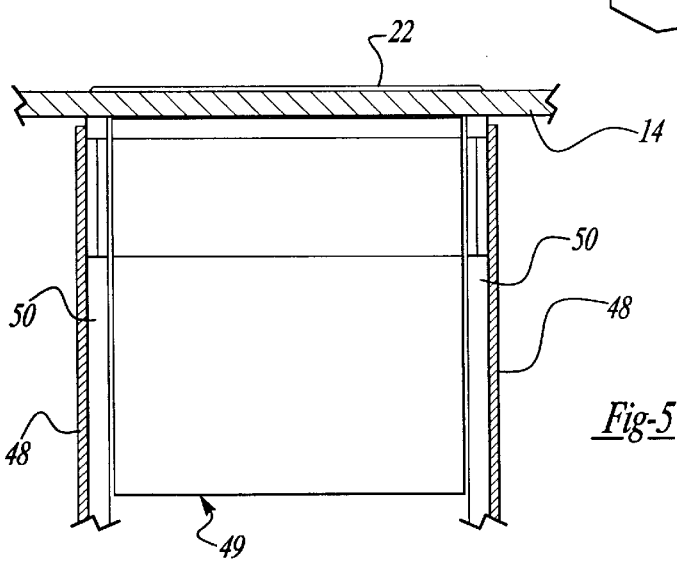
FIG. 5 is a fragmentary sectional view as seen from above showing an outside wall and two inside walls in the RV and a top view of the RV refrigerator of this invention showing the refrigerator with the flap system in sealed relation with the RV walls.

As shown in FIGS. 2 and 5, the refrigerator 10 is positioned in the vehicle 12 in a compartment 49 so that the cabinet 27 is spaced from the vehicle side wall 14. The flap 42 is then moved outwardly and upwardly until its outer extension 46 is in sealed engagement with a wall in the compartment 49, such as the compartment top wall 53.

Figure 4:
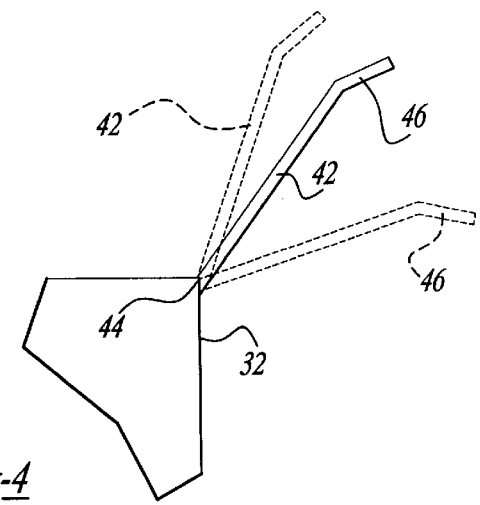
FIG. 4 is a diagrammatic view of a flap member in this invention showing the adjustable feature of the flap.
Figure 3:
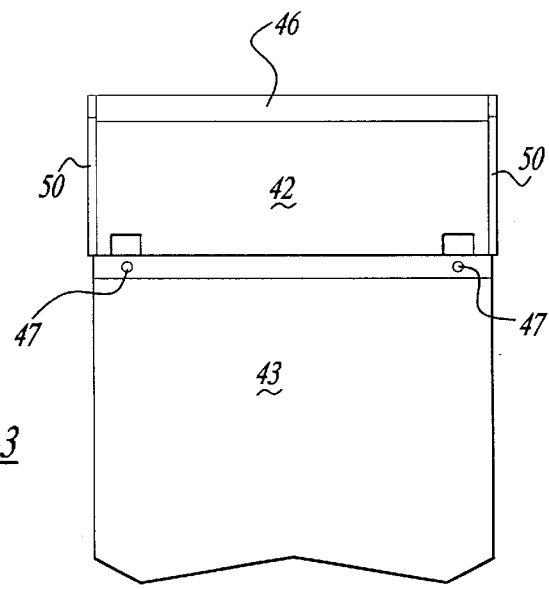
FIG. 3 is a fragmentary rear view of the RV refrigerator of this invention with refrigeration apparatus removed for purposes of clarity.

The panel 43 is shown in FIG. 3 secured to the back wall 32 of the cabinet 27 by means of screws 47. Any suitable mounting means that will enable the flap member 42 to be adjusted up or down, as shown in broken lines in FIG. 4, is within the purview of this invention.

The compartment 49 has side walls 48 located so that the side flaps 50 on the panel 43, the flap 42 and the flap extension 46 (FIG. 1A) can be in sealed engagement with the walls 48 to further prevent the flow of combustion gases into the living area of the RV.

Figure 1A:
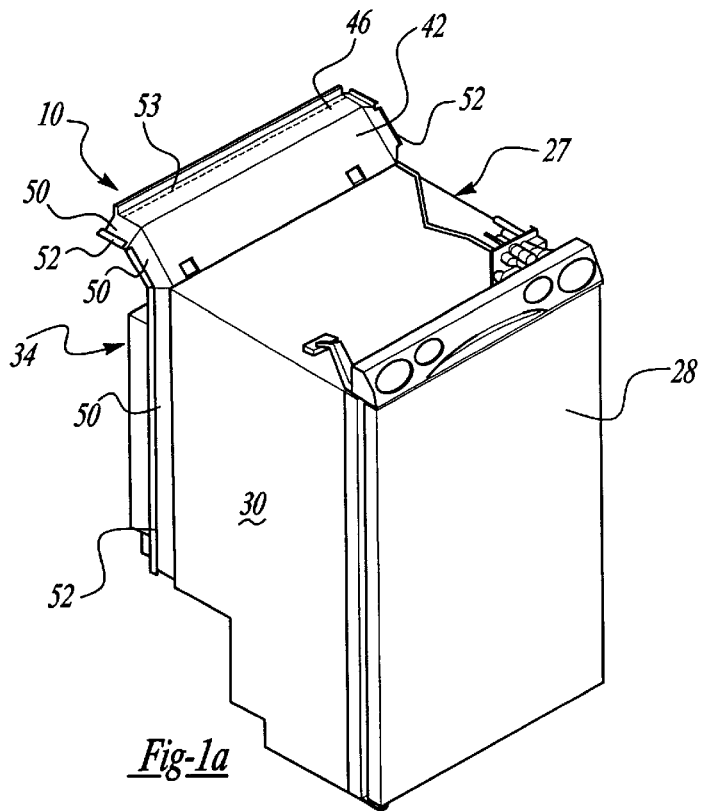
FIG. 1A is a perspective view of the RV refrigerator of this invention showing the front of the refrigerator.

In order to enhance the ability of the flap 42 to seal against the walls in the compartment 49, the flap extensions 46 and the side flaps 50 are provided with strips 52 of a resilient material such as rubber or foam, as shown in FIGS. 1A and 2.

In its installed position shown in the drawing, the flap member 42 and the side flaps 50 engage the walls of the compartment 49 in a sealed relation to thereby prevent combustion gases created by the refrigeration apparatus 34 from entering the vehicle living quarters and providing a plenum extension for the refrigerator apparatus 34 along with air flow through the apparatus for ventilation around the refrigerator 10. The configuration of the flap 42 with the angular extension 46 and the mounting of the flap 42 on the rear side 32 of the refrigerator cabinet 27 enables the installation of the refrigerator 10 in interior vehicle compartments of a wide range of sizes.

While the above description constitutes the preferred embodiments of the present invention, it will be appreciated that the invention is susceptible to modification, variation and change without departing from the proper scope and fair meaning of the accompanying claims.

We claim:

1. In a recreational vehicle having living quarters and a plurality of walls some of which form a compartment for a refrigerator, a refrigerator cabinet of generally block shape positioned in said compartment and having a back side and a top side, absorber refrigerating apparatus on said cabinet back wall, a flap member adjustably mounted on said cabinet back side above said refrigerating apparatus and adjacent the top side of said cabinet, said flap member being of a size to engage the walls of said compartment in a sealed relation to thereby prevent combustion gases created by said refrigerating apparatus from propagating into the vehicle living quarters and providing a plenum extension for said refrigerator apparatus and providing for air flow through the apparatus for ventilation around the refrigerator.

2. A refrigerator for recreational vehicles comprising a generally block shape cabinet having front, back, and top sides, refrigerating apparatus on the back side, and a flap member adjustably mounted on the back side at a position above the refrigerating apparatus, said flap member being comprised of a flat body extending upward and outwardly from said cabinet, said body terminating in an extension extending further outwardly at an angle to said flap member, and means mounting said flap member on said cabinet for adjustable movement about a generally horizontal axis.

3. The refrigerator of claim 2 further including a compartment for the refrigerator, said compartment being communicating with ventilating air and having top and side walls, said flap member being positioned on said cabinet and being in engagement with at least one of said walls so as to provide flow of said ventilation air in a predetermined path.

4. The refrigerator of claim 3 further including resilient seal material on at least some of the edges of said flap member enabling sealing of said flap member against at least one of said walls.

* * * * *